(12) United States Patent
Bock et al.

(10) Patent No.: US 6,715,768 B1
(45) Date of Patent: Apr. 6, 2004

(54) SEALING RING HAVING A SEALING BEAD

(75) Inventors: Eberhard Bock, Mörlenbach (DE); Gilbert Pataille, Corlee (FR); Boris Tchilingurian, Langres (FR)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/498,403

(22) Filed: Feb. 4, 2000

(30) Foreign Application Priority Data

Feb. 6, 1999 (DE) .......................... 199 04 862

(51) Int. Cl.$^7$ ................................ F16J 15/32
(52) U.S. Cl. ...................... 277/559; 277/549
(58) Field of Search ................. 277/549, 559, 277/560, 561, 570

(56) References Cited

U.S. PATENT DOCUMENTS

| | | | | |
|---|---|---|---|---|
| 4,568,092 A | * | 2/1986 | Hayashida | 277/559 |
| 4,695,063 A | * | 9/1987 | Schmitt | 277/559 |
| 4,746,128 A | * | 5/1988 | Freiwald | 277/349 |
| 5,615,894 A | * | 4/1997 | vom Schemm | 277/559 |
| 5,860,656 A | * | 1/1999 | Obata et al. | 277/559 |
| 6,079,715 A | * | 6/2000 | Johnen et al. | 277/565 |
| 6,168,164 B1 | * | 1/2001 | Toth et al. | 277/559 |
| 6,336,638 B1 | * | 1/2002 | Guth et al. | 277/500 |
| 6,513,810 B1 | * | 2/2003 | Pataille | 277/549 |
| 6,520,507 B2 | * | 2/2003 | Pataille et al. | 277/561 |

FOREIGN PATENT DOCUMENTS

| | | |
|---|---|---|
| DE | 33 16 063 | 5/1983 |
| DE | 195 39 057 | 4/1997 |
| EP | 0 789 498 | 8/1997 |
| EP | 0 895 009 | 2/1999 |

* cited by examiner

*Primary Examiner*—William Miller
(74) *Attorney, Agent, or Firm*—Kenyon & Kenyon

(57) ABSTRACT

A sealing ring having a sealing disk made of polymer material, which has a retaining segment and a sealing segment. The retaining segment is connected to a support ring and the sealing segment is curved in the direction of a space that is to be sealed off and sealingly surrounds a shaft against which it forms a seal on its peripheral side under radial prestressing. The sealing segment on the side facing the shaft has a first surface profiling, the first surface profiling on the side facing the space to be sealed off being formed by at least one recirculating element, and at least one dust lip being arranged on the side of the recirculating element facing away from the space to be sealed off. Between the recirculating element and the dust lip, an annular, self-contained sealing bead is arranged which sealingly surrounds the shaft on the peripheral side.

22 Claims, 5 Drawing Sheets

SEALING RING HAVING A SEALING BEAD

BACKGROUND OF THE INVENTION

The invention relates to a sealing ring of the type having a support ring and a polymeric sealing disk which has a retaining segment and a sealing segment. The retaining segment is connected to the support ring and the sealing segment is curved in the direction of a space to be sealed off and sealingly surrounds the shaft along a peripheral side of the sealing segment with a degree of radial prestressing. The sealing segment on the side facing the shaft has a first surface profiling, the first surface profiling on the side facing the space to be sealed off being formed by at least one recirculating element, and at least one dust lip being arranged on the side of the recirculating element facing away from the space to be sealed off.

A sealing ring of this type is described in the German Laid-Open Print 33 16 063. The sealing ring is provided for a machine part that executes rotational motions and is composed of a support ring that is connected in a liquid-tight manner to a sealing disk made of PTFE. The sealing disk is trumpet-shaped and faces the space to be sealed off, and, on the side facing the shaft to be sealed off, it has recirculating elements that act in a hydrodynamic manner. The trumpet-shaped sealing disk is provided with at least two recirculating elements of different profile depths and/or gradients, the recirculating elements being aligned in the same direction and penetrating each other.

SUMMARY OF THE INVENTION

The present invention is directed to the refinement of a sealing ring of the type noted above so that the sealing ring has improved static sealing when the shaft to be sealed is at rest.

Between the recirculating elements and the dust lip an annular, a self-contained sealing bead is arranged that sealingly encloses the shaft on its peripheral side.

In a configuration of this type, it is advantageous that the sealing segment of the sealing disk on the side facing the shaft to be sealed has three functional areas that are variously configured, each of the functional areas being responsible for achieving only one objective. The first surface profiling causes a recirculation of the medium to be sealed in the direction of the space to be sealed off. The sealing bead surrounds and encloses within itself the shaft to be sealed and in this manner, when the shaft is at rest, prevents leakage of the medium to be sealed in the direction of the dust lip, i.e., in the direction of the ambient environment. The dust lip effects a protection of the sealing bead and of the recirculating element from abrasive impurities from the ambient environment. The dust lip surrounds the surface of the shaft to be sealed preferably at a very small radial clearance in the range of a maximum of 0.5 mm or in special cases even being able to have contact with the shaft. The dust lip therefore has no wear and maintains good working properties throughout a long service life.

The recirculating element preferably is configured so as to be spiral-shaped and, viewed from the longitudinal section, has saw-tooth-shaped first recesses, which are placed so as to be adjoining and to have axial distance in relation to each other, the first boundary surface of each recess facing the space to be sealed forming a smaller angle with the surface of the shaft to be sealed than the second boundary surface facing away from the space to be sealed. The saw-tooth-shaped profile of the first surface profiling has the advantage that during the normal use of the radial shaft sealing ring, the medium to be sealed off is recirculated very well in the direction of the space to be sealed. As a result of the significantly larger volume of the saw-tooth-shaped recesses in comparison to indentations (i.e., notches) the recesses are less sensitive to oil carbons.

On the side of the recirculating element facing away from the shaft, it is preferable that a second surface profiling be arranged which, in the longitudinal section, is formed by second recesses running along the peripheral side, open on the side facing away from the shaft, and essentially U-shaped, the recesses being placed so as to be adjoining and to have axial distance with respect to each other. The saw-tooth-shaped recesses on the side of the sealing disk facing the shaft and the U-shaped recesses on the side of the sealing disk facing away from the shaft result in the sealing disk being very flexible in the radial direction and being able to follow the movements of the shaft to be sealed even in the event of radial deviations (i.e., run-outs). In addition, the U-shaped recesses, in connection with the saw-tooth-shaped recesses, result in a very large surface, which is well-suited to quickly remove from the sealing disk the frictional heat that arises.

The sealing disk is preferably composed of PTFE. In this manner, the sealing disk is resistant to most of the media to be sealed off. In addition, PTFE has good temperature resistance, as well as good sliding behavior. The sealing disk made of PTFE is virtually wear free, since after a certain initial wear, the surface is glazed and as a result becomes very resistant.

For example, injection-moldable copolymerides can be used such as FEP (perfluoroethylene propyl) or PFA (perfluoralcoxy copolymer) or a thermoplastic elastomer. However, the sealing disk can also be made of other materials.

The sealing disk preferably has a thickness of from 0.5 to 1 mm. The working properties are particularly advantageous if the thickness is from 0.6 to 0.75 mm, depending on the diameter of the shaft to be sealed. If the thickness of the sealing disk is less than 0.5 mm, it is disadvantageous that the recesses have to be reduced in their depth and the sealing disk encloses the shaft to be sealed with but a very small prestressing.

On the other hand, if the thickness of the sealing disk is more than 1 mm, it is disadvantageous that the sealing disk contactingly surrounds the shaft with a too great prestressing, leading to very large power losses.

The saw-tooth-shaped and/or U-shaped recesses, in the event the sealing disk is made of PTFE, are preferably impressed into the sealing disk without the removal of any material. In the case of injection-moldable copolymerides, the recesses are applied in the extrusion die. As a result of the fact that the recesses are manufactured so as to avoid machining processing methods, it is advantageous that the sealing disk, even if the shaft to be sealed off has radial deviations, stands up to a very high number of load changes without suffering damage, since the stress concentrations in the area of the recesses are significantly reduced in comparison to machining processing methods.

The saw-tooth-shaped and U-shaped recesses are preferably staggered in relation to each other. As a result of a configuration of this type, on the one hand, the result is an approximately identical material strength along the axial extension of the sealing disk; undesirable concentrations of material, which are disadvantageous from the point of view of production engineering and with a view to good working properties, are avoided by a configuration of this type. On the other hand, the articulated points are located between the saw-tooth-shaped recesses, so that the geometric dimensions of the saw-tooth-shaped recesses substantially are maintained, even if the sealing disk is used to seal shafts that are not round.

The ratio of the radial depth of the U-shaped recesses to the radial depth of the saw-tooth-shaped recesses can be from 1 to 4.5, with 3 being preferable. A ratio of this type provides an excellent balance among the good flexibility of the sealing disk in the radial direction as compensation for radial deviations of the shaft, a good seal of the medium to be sealed over a long service life, and a large surface for cooling the sealing disk and for removing the frictional heat.

The sealing bead—viewed in the longitudinal section—can be essentially configured so as to be square. The axial extension between two axially adjoining boundary surfaces preferably corresponds essentially to the axial extension of the sealing bead and to the axial extension of the dust lip. In a configuration of this type, it is advantageous that the axial width of the sealing ring can be kept optimally small.

According to an advantageous embodiment, provision can be made that the retaining segment is connected to the support ring by an intermediate layer made of elastomer material. Bonding the retaining segment to the intermediate layer can occur, for example, through the vulcanization of the two parts to each other. From an economic point of view, it has proven to be beneficial to produce the intermediate layer in the course of an immediate molding process and simultaneously to connect it to the support ring and the sealing disk by vulcanization.

According to a further embodiment, the retaining segment and the support ring can be directly braced on each other using a tensioning element made of a tough material. In this context, it is advantageous that the manufacture of a sealing ring of this type is particularly simple and therefore can be carried out in a cost-effective manner. The support ring and the tensioning element, for example, can each be made of a metallic material. As a result of the only force- and/or form-locking connection of the retaining segment between the support ring and the tensioning element, a separation of the components of the sealing ring is particularly simple after its use. The individual components can each be recycled according to type.

According to a further embodiment, provision is made for a nonwoven-fabric disk in the case of large quantities of dirt in the ambient environment.

DETAILED DESCRIPTION OF THE INVENTION

Figure 1B:
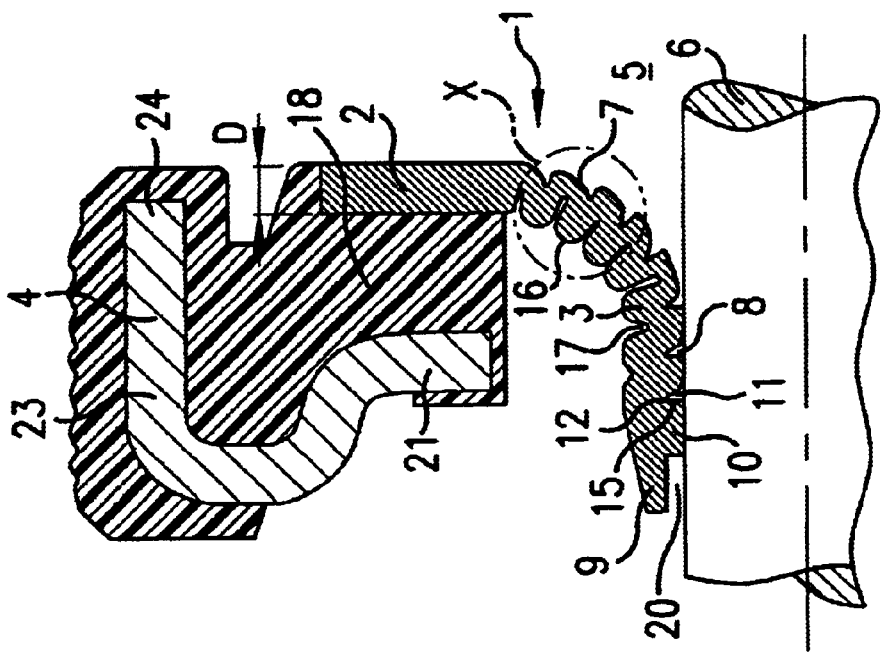
FIGS. 1A and 1B are cross sectional views of an embodiment of a sealing ring constructed according to the principles of the invention, before and after installation, respectively.
Figure 1A:
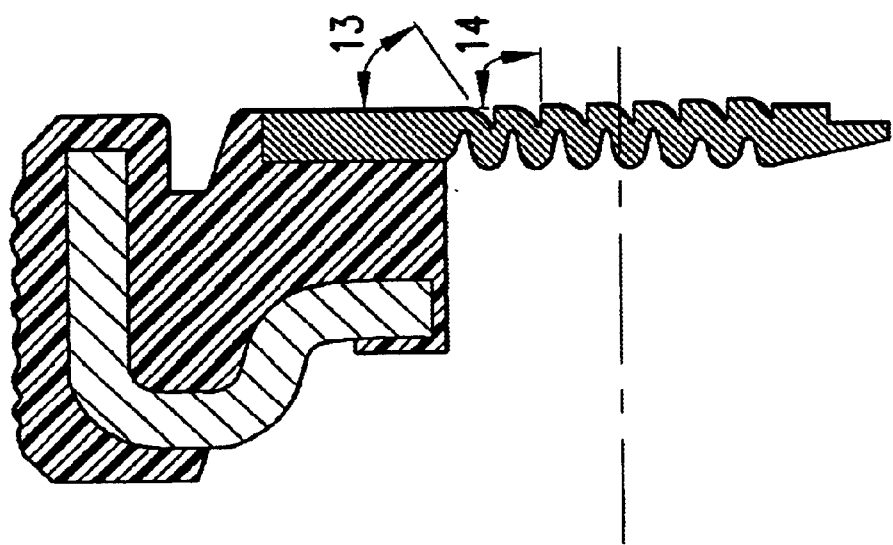

In each of the embodiments shown is a sealing disk 1 and a support ring 4. The sealing disk 1, in the exemplary embodiment of FIGS. 1A and 1B depicted here, is composed of PTFE and has a retaining segment 2 and a sealing segment 3. Retaining segment 2 is connected to support ring 4.

Sealing segment 3 is divided into three parts and, in the installed state, curves in the direction of a space 5 to be sealed off. Sealing segment 3 on the side facing shaft 6 has a first surface profiling 7, which in response to the rotation of shaft 6 causes a recirculation of the medium to be sealed off in the direction of space 5 to be sealed off. The recirculating element 8.

On the side of first surface profiling 7 that is axially facing away from the space to be sealed off, sealing bead 10 is arranged, which sealingly surrounds shaft 6 to be sealed off in a self-contained manner. Even when the shaft is stationary, an excellent degree of static sealing is assured in this manner.

On the side of sealing bead 10 that is facing away from space 5 to be sealed off, dust lip 9 is arranged, which in this exemplary embodiment defines a sealing gap 20 of minimal radial height with respect to the surface of shaft 6 to be sealed off.

The curving of sealing segment 3 towards the space to be sealed off is of significant advantage particularly with respect to assembly technology, since for the assembly of the sealing ring on a previously installed shaft, neither a mounting sleeve nor the prior shaping of the sealing segment is required. Therefore, the use of the previously described sealing ring is particularly advantageous as a crankshaft seal on the flywheel side and/or as a camshaft seal.

In FIGS. 1A and 1B, a first exemplary embodiment of the sealing disk is depicted, before and after installation, respectively. Recirculating element 8 is configured so as to be spiral-shaped and—viewed from the longitudinal section depicted here—has saw-tooth-shaped first recesses 11. The saw-tooth-shaped first recesses are configured such that first boundary surface 12 facing the space to be sealed off forms a smaller angle 13 with the surface to be sealed off of shaft 6 than second boundary surface 15 facing away from space 5 to be sealed off. Smaller angle 13 is preferably 15° to 75°, whereas larger angle 14 is roughly 90°.

Saw-tooth-shaped recesses 11 only extend in the area of sealing segment 3 and are staggered with respect to the U-shaped second recesses 17. In this exemplary embodiment, the ratio of the radial depth of U-shaped second recesses 17 to the radial depth of saw-tooth-shaped first recesses 11 is three. As a result of a ratio of this type, good flexibility of the sealing disk is assured in the radial direction to compensate for the radial deviations of the shaft. In addition, as a result of a profile of this type, a large surface is achieved for cooling the sealing disk and for removing frictional heat.

Retaining segment 2 in this exemplary embodiment is connected to support ring 4 by an intermediate layer 18, which is made of elastomer material.

The sealing ring depicted here, in addition to having its good working properties, has small dimensions in the axial direction.

Figure 2:
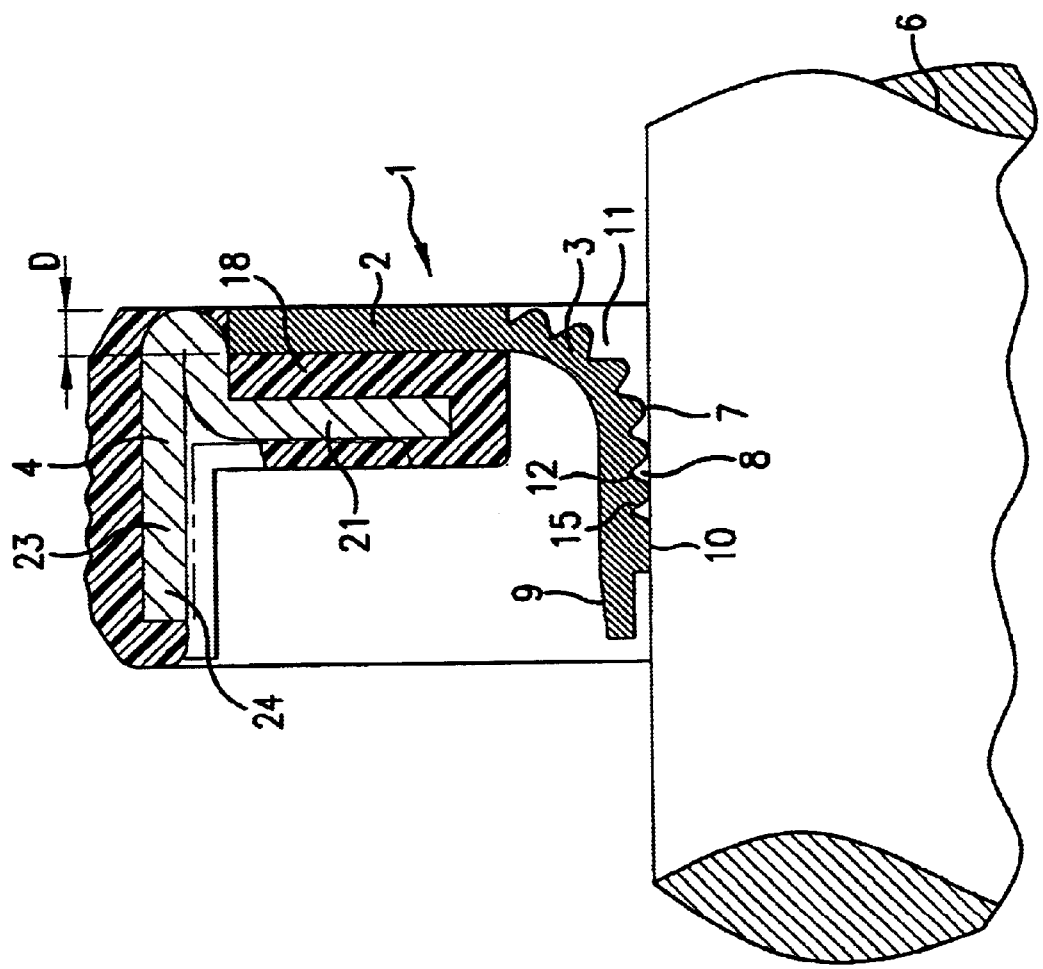
FIG. 2 is a cross sectional view of a second embodiment of a sealing ring constructed according to the principles of the invention.

In FIG. 2, a second exemplary embodiment of the sealing ring according to the invention is depicted. The sealing ring depicted here differs from the sealing ring in FIG. 1 primarily in that provision is made for a first surface profiling 7 having first recesses 11 only on the side of sealing segment 3 which faces shaft 6.

Support ring 4 is configured in such a manner and is arranged relative to sealing disk 1 such that sealing disk 1 is centered in its mounting space by support ring 4.

The connection of sealing disk 1 and support ring 4 is also accomplished in this embodiment by an intermediate layer 18 made of elastomer material, which completely encloses radial leg 21.

Figure 3B:
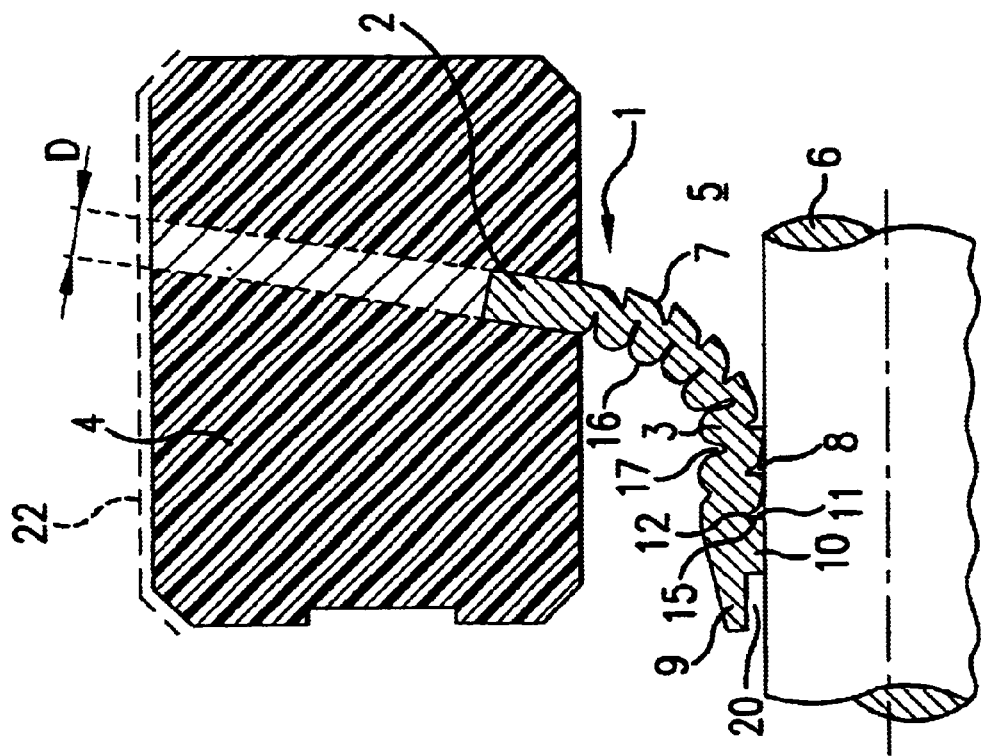
FIGS. 3A and 3B are cross sectional views of an additional embodiment of a sealing ring constructed according to the principles of the invention, before and after installation, respectively.
Figure 3A:
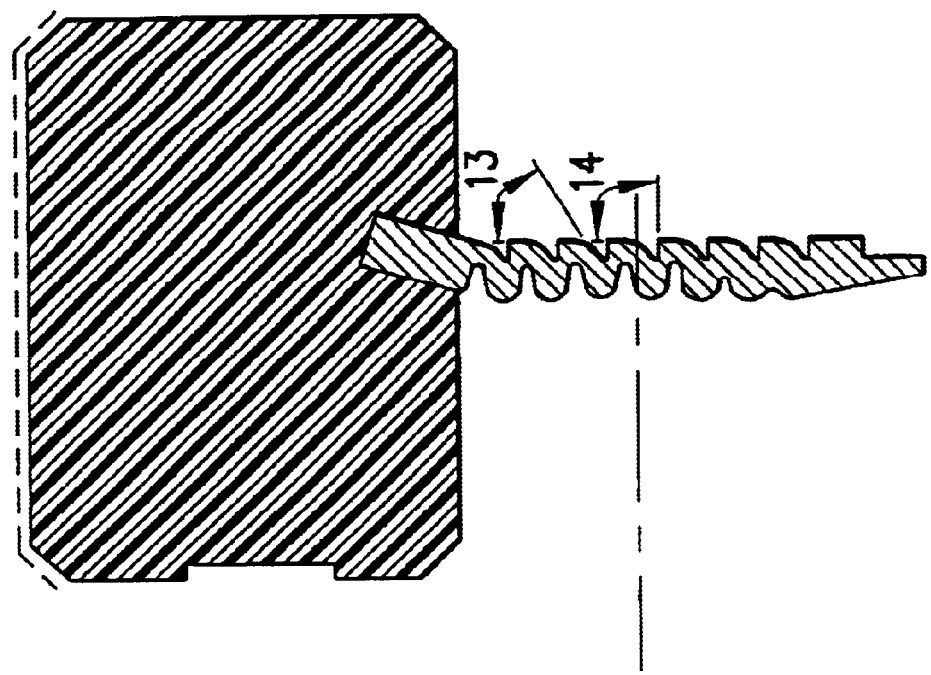

In FIGS. 3A and 3B, a third embodiment is depicted which differs from the two previously described embodiments in that support ring 4 is made not of a metallic but rather of a polymeric material. For the purposes of a seal in a housing that is not depicted here, support ring 4 can be coated on its outer peripheral side with a sealing lacquer 22.

Sealing segment 3 emerges from support ring 4 obliquely with respect to shaft 6, which influences the radial contact pressure on shaft 6 in a positive manner.

Figure 4B:
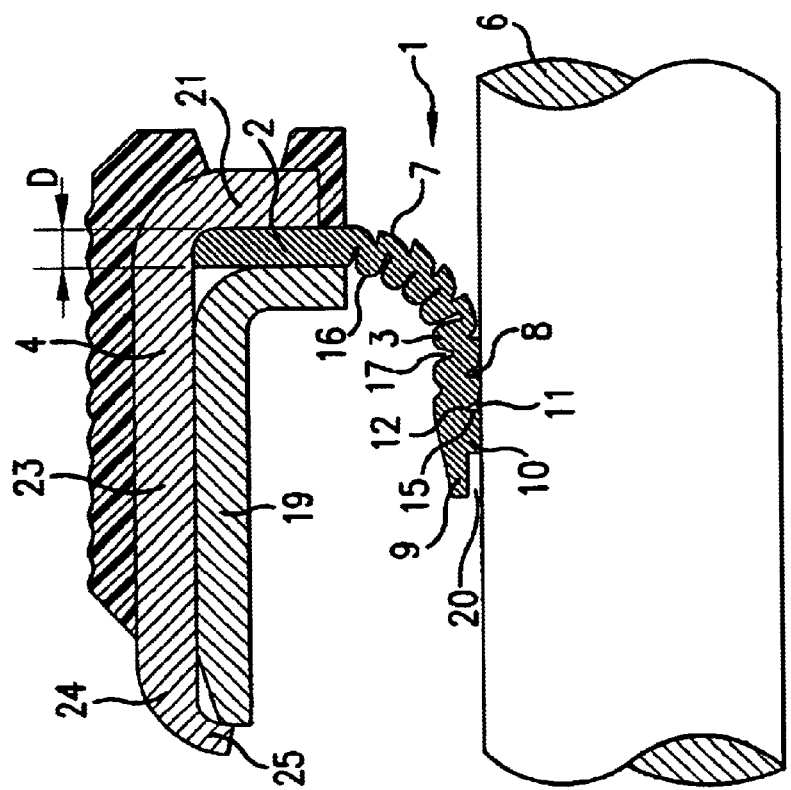
FIGS. 4A and 4B are cross sectional views of an additional embodiment of a sealing ring constructed according to the principles of the invention, before and after installation, respectively.
Figure 4A:
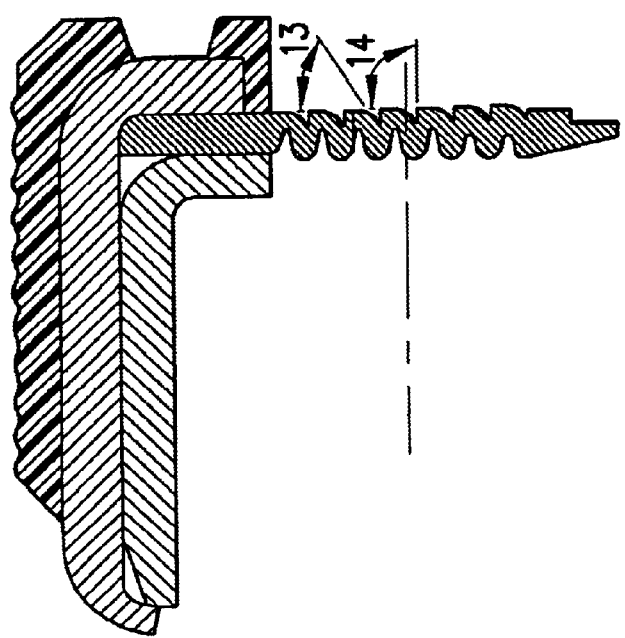

In FIGS. 4A and 4B, a fourth exemplary embodiment is depicted, which differs from the embodiments in FIGS. 1 through 3 mainly in the mounting of sealing disk 1 on support ring 4. In the exemplary embodiment depicted here, support ring 4 is configured essentially so as to be L-shaped, axial leg 23 on front side 24, facing away from space 5 to be sealed off, having an undercut 25, into which tensioning element 19 has been snapped into place in a form-locking manner. Tensioning element 19 presses retaining segment 2, under axial prestressing, against radial leg 21 of support ring 4.

Figure 5:
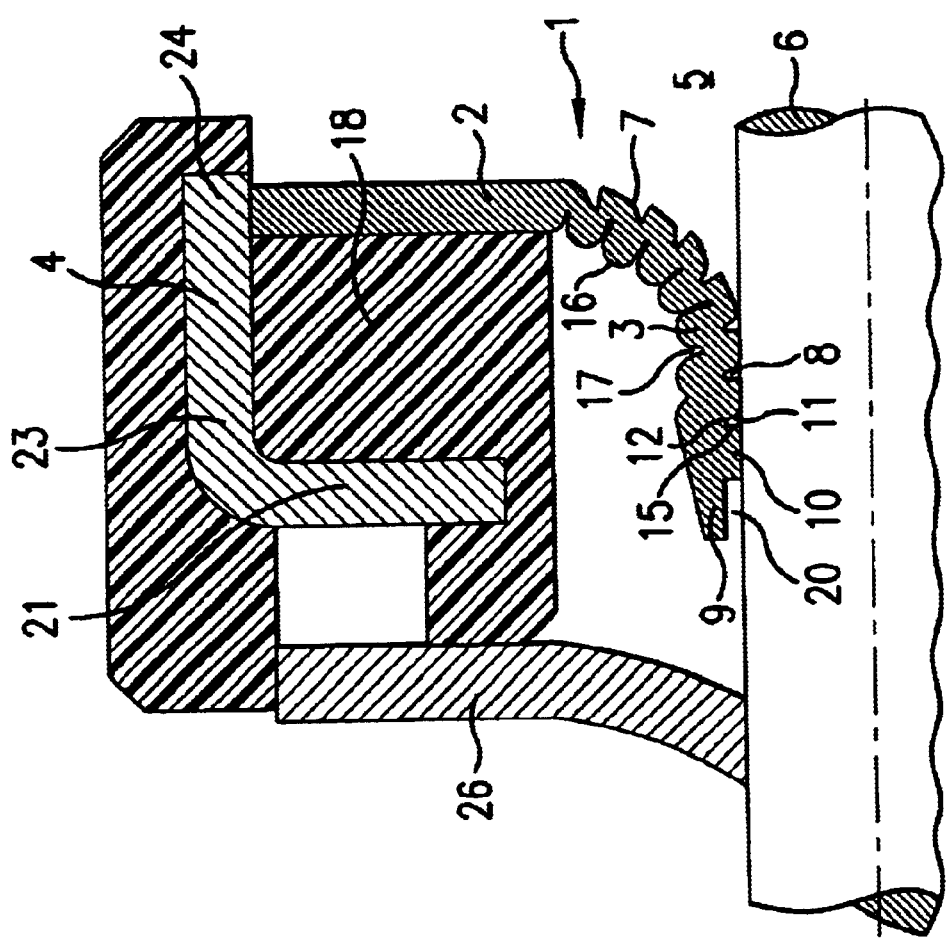
FIG. 5 is a cross sectional view of an additional embodiment of a sealing ring constructed according to the principles of the invention.

In FIG. 5, a further embodiment is shown, which differs from the other embodiments mainly in that on the side that is facing away from space 5 to be sealed off, a nonwoven-fabric disk 26 is arranged, which surrounds shaft 6 so as to seal off impurities.

What is claimed is:

1. A sealing ring, comprising:

a support ring;

a polymeric sealing disk which has a first end and a second end, viewed in the longitudinal section, a retaining segment and a sealing segment, the retaining segment, including the second end, being connected to the support ring and the sealing segment being curved in the direction of a medium to be sealed off by the sealing segment from ambient exterior environment and sealingly surrounding a shaft to be sealed off along a peripheral side of the sealing segment with a degree of radial prestressing, the sealing segment on the side facing the shaft having a first surface profiling, the first surface profiling on the side facing the medium to be sealed off being formed by at least one recirculating element, and at least one dust lip being arranged on the first end in a region laterally adjoining the recirculating element facing away from the medium to be sealed off; and wherein between the recirculating element and the dust lip an annular, self-contained sealing bead is arranged, which sealingly surrounds the shaft on the peripheral side.

2. The sealing ring as recited in claim 1, wherein the recirculating element is configured so as to be spiral-shaped and, viewed in the longitudinal section, has saw-tooth-shaped first recesses, which are placed so as to be adjoining and have axial distance with respect to each other, and a first boundary surface of each recess faces the medium that is sealed off forming a smaller angle with the surface of the shaft than the a second boundary surface that faces away from the space to be sealed off.

3. The sealing ring as recited in claim 2, wherein a side of the recirculating element faces away from the shaft, on which a second surface profiling is arranged, which in longitudinal section is formed essentially by U-shaped second recesses, running along the peripheral side and open on the side facing away from the shaft, the recesses being placed so as to be adjoining and to have axial distance with respect to each other.

4. The sealing ring as recited in claim 3, wherein the ratio of the radial depth of the U-shaped recesses to the radial depth of the saw-tooth-shaped recesses is from 1 to 4.5.

5. The sealing ring as recited in claim 2, wherein the sealing disk is made of injection-moldable copolymerides.

6. The sealing ring as recited in claim 2, wherein the sealing disk has a thickness D of 0.5 to 1 mm.

7. The sealing ring as recited in claim 2, wherein the saw-tooth-shaped and a U-shaped recesses are staggered with respect to each other.

8. The sealing ring as recited in claim 2, wherein the axial extension between the second boundary surfaces, axially adjoining each other, essentially corresponds to the axial extension of the sealing bead and the axial extension of the dust lip.

9. The sealing ring as recited in claim 1, wherein a side of the recirculating element faces away from the shaft, on which a second surface profiling is arranged, which in longitudinal section is formed essentially by U-shaped second recesses, running along the peripheral side and open on the side facing away from the shaft, the recesses being placed so as to be adjoining and to have axial distance with respect to each other.

10. The sealing ring as recited in claim 9, wherein the sealing disk is made of PTFE.

11. The sealing ring as recited in claim 9, wherein the saw-tooth-shaped and a U-shaped recesses are staggered with respect to each other.

12. The sealing ring as recited in claim 1, wherein the sealing disk is made of PTFE.

13. The sealing ring as recited in claim 1, wherein the sealing disk is made of injection-moldable copolymerides.

14. The sealing ring as recited in claim 1, wherein the sealing disk has a thickness D of 0.5 to 1 mm.

15. The sealing ring as recited in claim 1, wherein the recesses are impressed into the sealing disk without removal of any material.

16. The sealing ring as recited in claim 15, wherein the ratio of the radial depth of the U-shaped recesses to the radial depth of the saw-tooth-shaped recesses is from 1 to 4.5.

17. The sealing ring as recited in claim 1, wherein the sealing bead, viewed in the longitudinal section, is essentially configured so as to be square.

18. The sealing ring as recited in claim 1, wherein the retaining segment is connected to the support ring by an intermediate layer made of elastomer material.

19. The sealing ring as recited in claim 1, wherein the retaining segment and the support ring are braced directly against each other using a tensioning element made of tough material.

20. The sealing ring as recited in claim 1, wherein the support ring is made of polymer material.

21. The sealing ring as recited in claim 1, wherein on the side facing away from the medium to be sealed off a nonwoven-fabric disk is arranged that surrounds the shaft so as to seal off impurities.

22. The sealing ring as recited in claim 1, wherein an annular space exists along an entire length of the dust lip between the shaft and the dust lip surrounding the shaft.

* * * * *